(No Model.) 2 Sheets—Sheet 1.
P. H. CURTNER & C. C. GENUNG.
CAR BRAKE.
No. 313,186. Patented Mar. 3, 1885.
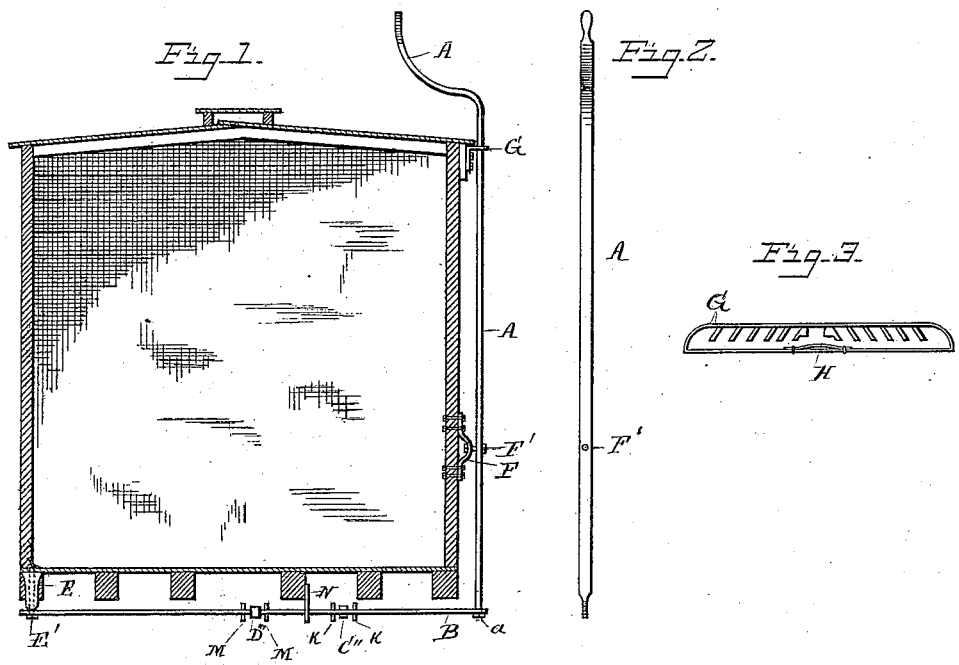
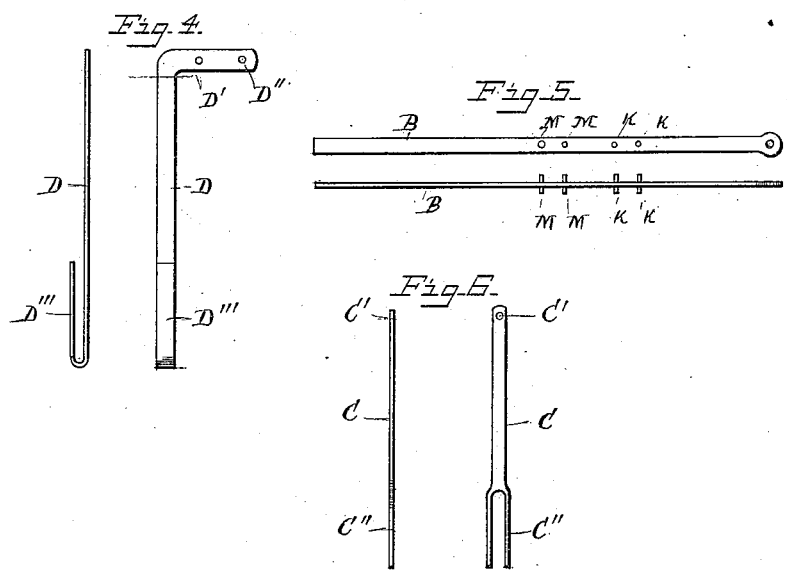
WITNESSES
Edwin L. Bradford
Morton Toulmin
INVENTOR
Paul H. Curtner
Charles C. Genung
W. P. Leonard
By Attorney (No Model.) 2 Sheets—Sheet 2.

P. H. CURTNER & C. C. GENUNG.
CAR BRAKE.

No. 313,186. Patented Mar. 3, 1885.

WITNESSES
Edwin L. Bradford
Morton Toulmin

INVENTOR
Paul H. Curtner
Charles C. Genung
W. P. Leonard
By Attorney

UNITED STATES PATENT OFFICE.

PAUL H. CURTNER, OF HAZLETON, AND CHARLES C. GENUNG, OF EVANSVILLE, INDIANA.

CAR-BRAKE.

SPECIFICATION forming part of Letters Patent No. 313,186, dated March 3, 1885.

Application filed January 15, 1885. (No model.)

*To all whom it may concern:*

Be it known that we, PAUL H. CURTNER and CHARLES C. GENUNG, citizens of the United States, residing at Hazleton, Gibson county, and Evansville, in the county of Vanderburgh and State of Indiana, respectively, have invented certain new and useful Improvements in Car-Brakes, of which the following is a specification, reference being had to the accompanying drawings.

This invention relates to improvements in brake-rods and attachments for railway-cars, particularly freight-cars; and has for its object to provide a simple, strong, durable, and easily-operated brake-rod. This object is attained by the mechanism illustrated in the accompanying drawings, forming a part of this specification, in which—

Figure 7:
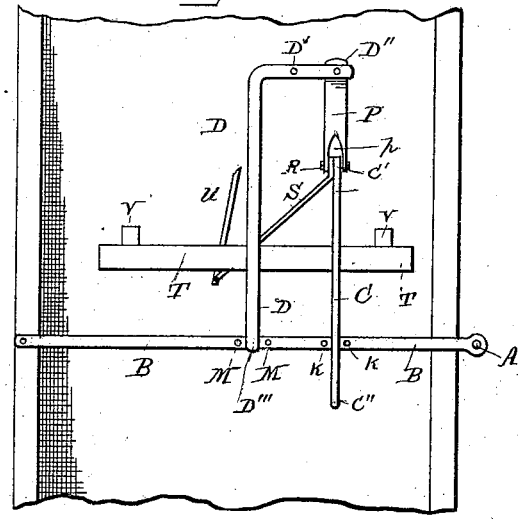
Figure 8:
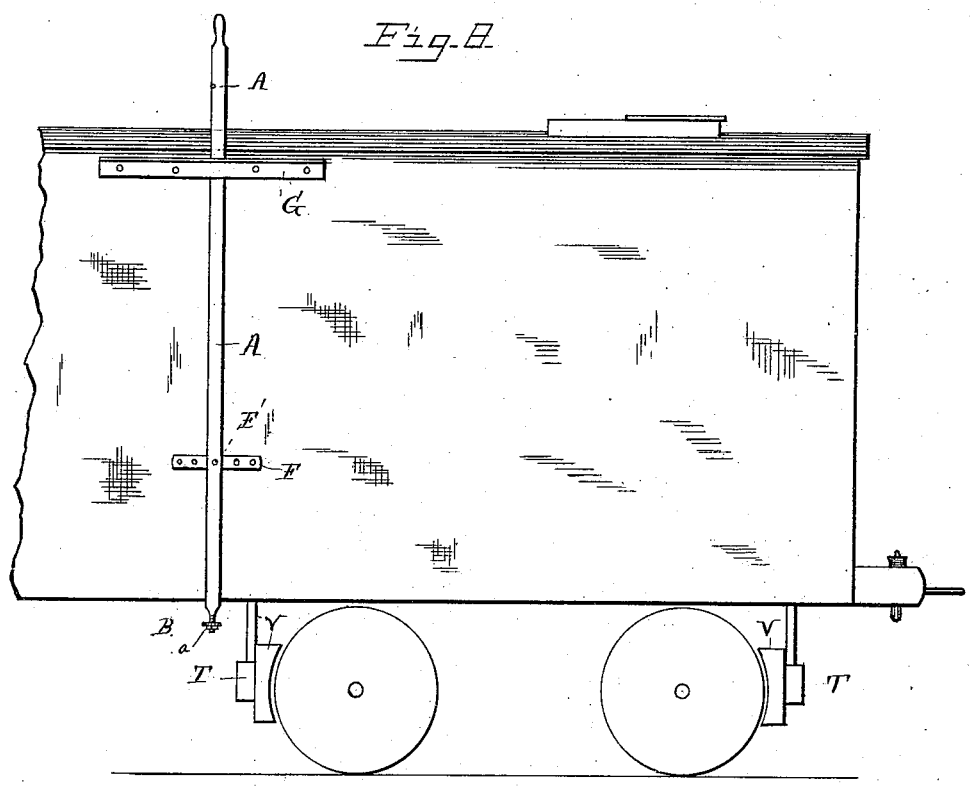

Figure 1 is a cross-section of a freight-car from which the wheels have been removed, and shows the relative positions of the different parts of the invention. Fig. 2 is a detached view of the brake-rod. Fig. 3 is a view of the ratchet to hold the brake-rod when set in place. Fig. 4 are side and plan views of a transverse bar. Fig. 5 shows side and plan views of a horizontal bar extending across the car under the bottom. Fig. 6 shows side and plan views of another transverse bar which is to be fastened to the rod which is attached directly to the brake-beam rod of any ordinary freight-car. Fig. 7 is a view taken from the bottom of the car. Fig. 8 is a side elevation.

The letter A indicates a brake rod or lever which is pivoted to the side of the car by a bolt, F', suitably secured to the curved plate F, which is bolted or otherwise fastened to the side of the car. This rod extends in an upward direction through an opening in an iron plate, G, furnished with ratchet-teeth, and a spring, H, for purposes hereinafter described. The upper end of the rod is of a curved form, and extends partly over the roof of the car, thereby assuming nearly a central position over the top of the car, so as to enable it to be more easily reached by the brakeman. The lower end of the rod A is threaded and passed through an opening in one end of the horizontal bar B, where it is secured by means of a nut, a. The horizontal bar B extends across the bottom of the car under the floor beams or sills to a pedestal, E, to which it is pivoted by means of a bolt, E', and is kept in place by a stirrup, N. This bar B is provided with lugs K and M, which maintain the bars C and D in their proper places. The bar C is bifurcated at one end, and is fitted over the bar B between the lugs K. The other end is provided with an opening, C', through which a bolt is inserted, by means of which it may be fastened to the bar P and rod S, which latter is attached directly to the brake-beam T on any ordinary freight-car. The bar D is provided with an opening at D', through which a bolt may be passed to fasten it to the bottom of the car, and at D" with another opening, whereby it may be fastened with a bolt to a bar, P, having a suitable opening at one end for the purpose, and being provided at the other end with a fork, p, which receives the ends of bar C and rod S, (which are attached directly to the brake-beam on any ordinary freight-car on the ordinary truck,) and are secured therein by means of the bolt R.

U is the rod which connects brake-beam to trucks. The other end of the rod D is bent as shown at D'''. This portion of the bar is placed over the bar B between the lugs M M. The ratchet-teeth on the bar G are intended to hold the brake-rod A when set in place when in use, and the spring H to maintain it in position when not in use. The brake-rod A is intended to be placed immediately in the rear of the trucks, about ten feet from the end of the car, and is applicable to any ordinary brake, especially on freight-cars, and to either inside or outside brakes, and works equally well by setting the lever A either forward or backward. It is operated from the top of the car by the brakeman.

Having described our invention, what we desire to secure by Letters Patent and claim is—

A brake-rod, A, curved transversely over the roof of a car, passing through a plate, G, having ratchet-teeth, and spring H, attached to the side of a car, said rod A being pivotally attached to a curved plate, F, by means of a bolt, F', in combination with bar B, having lugs K and M, the bar D, having curved portion D''', adapted to fit over said bar B between lugs M, the said bar D being curved at the other end and pivoted to the bottom of a car, the bar P, bolted thereto, having fork $p$, the bar C, pivotally connected therewith at one end, and having fork C' at the other end adapted to slide over bar B, between the lugs K and the rod S, attached to bar P at one end and to the brake-beam T at the other, substantially as described, and for the purposes set forth.

In testimony whereof we affix our signatures in presence of two witnesses.

PAUL H. CURTNER.
CHARLES C. GENUNG.

Witnesses:
W. P. LEONARD,
J. G. WINFREY.